(12) United States Patent
Ko (10) Patent No.: US 10,984,681 B2
(45) Date of Patent: Apr. 20, 2021

(54) DEVICE FOR FORMING PATTERN ON SURFACE OF FRUITING VEGETABLES

(71) Applicant: MANIFARM CO., LTD., Busan (KR)

(72) Inventor: Young Kyun Ko, Busan (KR)

(73) Assignee: MANIFARM CO., LTD., Busan (KR)

( * ) Notice: Subject to any disclaimer, the term of this patent is extended or adjusted under 35 U.S.C. 154(b) by 0 days.

(21) Appl. No.: 16/475,848

(22) PCT Filed: Nov. 28, 2017

(86) PCT No.: PCT/KR2017/013709
§ 371 (c)(1),
(2) Date: Jul. 3, 2019

(87) PCT Pub. No.: WO2018/128273
PCT Pub. Date: Jul. 12, 2018

(65) Prior Publication Data
US 2019/0355283 A1   Nov. 21, 2019

(30) Foreign Application Priority Data

Jan. 6, 2017   (KR) .................. 10-2017-0002547

(51) Int. Cl.
*B44C 1/24*   (2006.01)
*G09F 3/02*   (2006.01)
(Continued)

(52) U.S. Cl.
CPC .............. *G09F 3/02* (2013.01); *A01G 7/06* (2013.01); *B44C 1/24* (2013.01); *G09F 3/04* (2013.01);
(Continued)

(58) Field of Classification Search
CPC .............. G09F 2003/0251; G09F 2003/0283
(Continued)

(56) References Cited

U.S. PATENT DOCUMENTS 381,879 A * 4/1888 Howard ................. B65D 63/10
24/17 R
5,195,893 A * 3/1993 Casale ................... B43L 13/20
33/565
(Continued)

FOREIGN PATENT DOCUMENTS

KR   10-2000-0024276 A   5/2000
KR      20-0325495 Y1    9/2003
(Continued)

OTHER PUBLICATIONS

Machine translation of KR 20200435959, Dec. 11, 2006 (Year: 2006).*
(Continued)

*Primary Examiner* — Kristina N Junge
(74) *Attorney, Agent, or Firm* — Rabin & Berdo, P.C.

(57) ABSTRACT

The present invention relates to a device for forming a pattern on a surface of a fruiting vegetable and, more particularly, to a device which can be mounted on an immature fruiting vegetable without a separate fixing device, changes the shape thereof as the fruiting vegetable grows, and is capable of engraving a predetermined pattern on a surface of the immature fruiting vegetable so as to be clearly identified. A device for forming a pattern on a surface of a fruiting vegetable according to an embodiment of the present invention comprises: a member made of plastic, of an annular shape without a cut portion, having an inner surface and an outer surface, an opening defined by the inner surface, and a pattern formed on the inner surface of the member, wherein the member includes a first folded portion and a second folded portion; the inner surface of the member includes a first opposing surface and a second opposing surface that face each other due to the first folding portion and the second folding portion; the first opposing surface and the second opposing surface can be mounted on the
(Continued)

surface of the fruiting vegetable by pressing both surfaces of the immature fruiting vegetable arranged on the opening by elasticity formed by the first folded portion and the second folded portion; and the shape of the member changes so as to correspond to the surface shape of the fruiting vegetable as the fruiting vegetable grows.

12 Claims, 6 Drawing Sheets

(51) Int. Cl.
    *A01G 7/06*     (2006.01)
    *G09F 3/04*     (2006.01)
    *G09F 23/00*     (2006.01)

(52) U.S. Cl.
    CPC ...... *G09F 23/00* (2013.01); *G09F 2003/0251* (2013.01); *G09F 2003/0285* (2013.01)

(58) Field of Classification Search
    USPC .......................................................... 40/637
    See application file for complete search history.

(56) References Cited

U.S. PATENT DOCUMENTS

| | | | | |
|---|---|---|---|---|
| 7,125,049 | B2 * | 10/2006 | Goldberg | ............... B42D 9/004 281/42 |
| 9,207,527 | B1 * | 12/2015 | Shooshan | ................. G09F 7/12 |

FOREIGN PATENT DOCUMENTS

| | | |
|---|---|---|
| KR | 20-0340868 Y1 | 2/2004 |
| KR | 20-0435959 Y1 | 3/2007 |
| KR | 10-2007-0055942 A | 5/2007 |

OTHER PUBLICATIONS

Machine translation of KR 20200412797, Dec. 1, 2005 (Year: 2005).*

Second machine translation of Yang (KR 20-0435959). (Year: 2007).*

* cited by examiner

DEVICE FOR FORMING PATTERN ON SURFACE OF FRUITING VEGETABLES

TECHNICAL FIELD

The present invention relates to a device for forming a pattern on a surface of a fruiting vegetable, and more specifically, to a device for forming a pattern on a surface of a fruiting vegetable, which may be mounted on an immature fruiting vegetable without a separate fixing device, of which a shape may be changed according to growth of the immature fruiting vegetable, and which may imprint a certain pattern on a surface of a mature fruiting vegetable such that the certain pattern is clearly identifiable.

BACKGROUND ART

As awareness of the importance of an origin and distributor of agricultural products has increased, an attempt to differentiate a fruit or vegetable from other products has been made by imprinting a trademark or specific character on the fruit or vegetable to sell the fruit or vegetable.

In particular, various attempts have been made to arouse purchasing needs of a consumer and promote sales by forming a fruit in a certain form instead of the original form of the fruit or by imprinting a characteristic or picture such as "pass" or "luck" on a surface of the fruit.

Among the various attempts, there is a method of permanently marking characteristics or a picture such as a trademark, a producer, or a commemorative message on a fruit. Specifically, there is a method of attaching a sticker with a shape indicating a certain mark on a fruit during growth of the fruit and blocking light from being incident on the attached portion of the fruit to allow a mark with a shape corresponding to the shape of the sticker to be formed by discoloration of a surface of the fruit. However, in the above method, the sticker should be attached in accordance with a proper growth stage of the fruit, and it takes a considerable amount of time to discolor the fruit. In addition, after the sticker is attached, the attached state of the sticker is loosened due to the growth of the fruit and a wind or heavy rain, resulting in a problem in that a large amount of fruits are in a defective printed state in which a clear characteristic or figure is not obtained due to loosening of the attached state. Furthermore, the above method may have an effect of marking a character in the case of a fruit having a clear skin color such as an apple or a watermelon but may not obtain a particular effect of forming a characteristic due to light blockage in the case of a pear or a persimmon.

As another method, there is a method of forming a character or figure on a surface of a fruit by injuring a skin of the fruit in a process of producing the fruit. However, when a fruit is produced by injuring a surface thereof, since a surface of a growing fruit should be scratched, high accuracy is required. Thus, work efficiency is considerably lowered, and a wound is recovered as the fruit grows, resulting in a problem in that the character or figure may not be recognizable frequently.

DISCLOSURE

Technical Problem

The present invention is directed to providing a device capable of forming a certain pattern on a surface of a mature fruiting vegetable such that the certain pattern is clearly identified.

In addition, the present invention is directed to providing a device capable of being mounted on a surface of a fruiting vegetable without a separate fixing device.

Technical Solution

According to an embodiment of the present invention, a device for forming a pattern on a surface of a fruiting vegetable includes a member which has an inner surface, an outer surface, an opening defined by the inner surface, and an annular shape without a cut portion and is made of a plastic material; and a pattern which is formed on the inner surface of the member, wherein the member includes a first folded portion and a second folded portion, and the inner surface of the member has a first opposite surface and a second opposite surface which face each other due to the first folded portion and the second folded portion, the first opposite surface and the second opposite surface press both sides of a surface of an immature fruiting vegetable through elasticity formed by the first folded portion and the second folded portion so that the member is mountable on the surface of the fruiting vegetable, and the shape of the member changes to correspond to a surface shape of the fruiting vegetable as the fruit vegetable grows.

After a circumference of the surface of the fruiting vegetable, which is in contact with the inner surface of the member, is equal to a circumference of the inner surface of the member, the pattern may be imprinted on the surface of the fruiting vegetable.

As the fruiting vegetable grows, a contact area between the inner surface of the member and the surface of the fruiting vegetable may be increased, and an area of the inner surface of the member, which faces the surface of the fruiting vegetable, may be constant.

The first folded portion and the second folded portion may be disposed to face each other.

The first folded portion and the second folded portion may have an angled or curved shape.

The pattern may be an embossed pattern or an engraved pattern.

The pattern may be a printed pattern formed on at least one of the inner surface, the outer surface, and an interior of the member.

The device may further include an insert disposed between the pattern and the inner surface of the member.

The device may further include an insert disposed on the inner surface of the member and spaced apart from the pattern.

The insert may have one surface coupled to the inner surface of the member, and the one surface of the insert may have a groove for cutting.

Transparency of the insert may be different from transparency of the pattern.

The device may further include a bag, wherein the member is coupled to an interior of the bag.

Advantageous Effects

When a device for forming a pattern on a surface of a fruiting vegetable of the present invention is used, a certain pattern can be formed on a surface of a mature fruiting vegetable so as to be clearly identified.

In addition, the device can be mounted on a surface of a fruiting vegetable without a separate fixing device.

MODES OF THE INVENTION

Hereinafter, a device for forming a pattern on a surface of a fruiting vegetable according to the present invention will be described in detail with reference to the drawings.

The detailed descriptions of specific embodiments shown in the accompanying drawings are intended to be read in connection with the accompanying drawings, which are to be considered part of the entire written description. Any reference to a direction or orientation is merely intended for convenience of description and is not intended in any way to limit the scope of the present invention.

Specifically, relative terms such as "lower," "upper," "horizontal," "vertical," "above," "below," "up," "down," "top," and "bottom" as well as derivatives thereof (e.g., "horizontally," "downwardly," "upwardly," etc.) should be construed to refer to the orientation as described or as shown in the drawing under discussion. In particular, these relative terms are for convenience of description only and do not require that the device be constructed or operated in a particular orientation.

Also, terms such as "mounted," "attached," "connected," "coupled," and "interconnected," which refer to a mutual coupling relationship between components, may mean a state in which individual components are attached, connected, or fixed directly or indirectly unless expressly described otherwise. In addition, the terms may means a state in which the components are non-movable as well as a state in which the components are movably attached, connected, or fixed.

Figure 1:
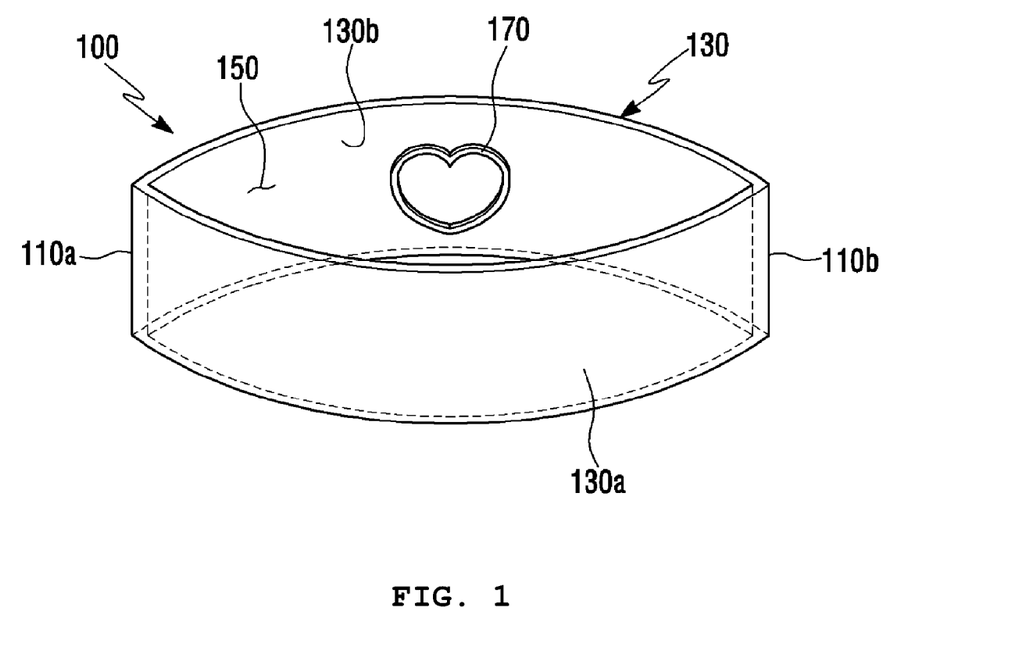
FIG. 1 is a perspective view illustrating a device for forming a pattern on a surface of a fruiting vegetable according to an embodiment of the present invention.
Figure 2:
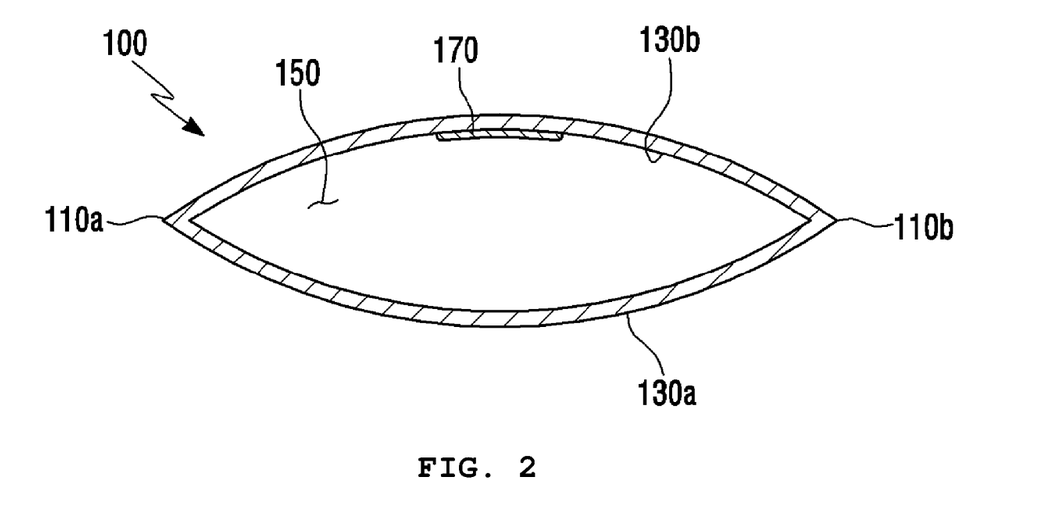
FIG. 2 is a cross-sectional view illustrating the device for forming the pattern on the surface of the fruiting vegetable shown in FIG. 1.

FIG. 1 is a perspective view illustrating a device for forming a pattern on a surface of a fruiting vegetable according to an embodiment of the present invention, and FIG. 2 is a cross-sectional view illustrating the device for forming the pattern on the surface of the fruiting vegetable shown in FIG. 1.

Referring to FIGS. 1 and 2, a device 100 for forming a pattern on a surface of a fruiting vegetable includes a member 130 and a pattern 170.

The member 130 may have a light transmitting property. When the member 130 has the light transmitting property, light may be provided on a surface of a fruiting vegetable even when the fruiting vegetable is inserted into an opening 150. The member 130 may be transparent or semi-transparent. In addition, the member 130 may not have the light transmitting property. For example, the member 130 may be opaque.

Thus, the member 130 may be made of any material that is transparent, semi-transparent, or opaque. For example, when the fruiting vegetable is a pear, since the pear generally grows in a state of being wrapped with an opaque bag, the member 130 may be made of an opaque material. On the other hand, when the fruiting vegetable is an apple, since the apple requires light while growing, the member 130 may be made of a transparent or semi-transparent material.

The member 130 may be made of a resin material. For example, the member 130 may be made of plastic. In addition, the member 130 may be made of a polymer. For example, the polymer includes polypropylene (PP), polyethylene terephthalate (PET), polyethylene (PE), polycarbonate (PC), polystyrene (PS), or the like.

The member 130 has an annular shape. Here, the member 130 may have an annular shape having no cut portion. The member 130 having the annular shape has the opening 150 therein.

The opening 150 of the member 130 corresponds to a size of a fruiting vegetable that is to be inserted into the device 100 according to the embodiment of the present invention.

The member 130 has an outer surface 130a and an inner surface 130b. The inner surface 130b defines the opening 150 of the member 130. A fruiting vegetable, such as an apple or a pear, is inserted into the opening 150.

The member 130 has a shape that is mountable on a surface of a fruiting vegetable by the member 130 being pressed on both sides of the surface of the fruiting vegetable disposed in the opening 150. In addition, the member 130 has a shape that corresponds to a surface shape of the fruiting vegetable as the fruiting vegetable grows.

Due to the material and shape of the member 130 itself, the device 100 according to the embodiment of the present invention may be fixedly mounted on the surface of the fruiting vegetable, and thus, there may be no need for a separate fixing device to be fixed to the fruiting vegetable.

A sectional shape of the inner surface 130b of the member 130 may be an elliptical shape. When the sectional shape of the inner surface of the member 130 is elliptical shape, the member 130 may press both sides of a surface of a fruiting vegetable inserted into the inner surface of the member 130 and thus be mounted on the surface of the fruiting vegetable while pressing the surface of the fruiting vegetable.

In addition, the sectional shape of the inner surface 130b of the member 130 may be changed to correspond to a surface shape of a fruiting vegetable as the fruiting vegetable grows. In addition, the sectional shape of the inner surface 130b of the member 130 may be changed from the elliptical shape to a shape corresponding to a surface shape of a fruiting vegetable.

The member 130 has the opening 150 defined by the inner surface 130b. Since the opening 150 is defined by the inner surface 130b, a sectional shape of the opening 150 is also an elliptical shape.

A shape of the opening 150 may be changed to correspond to a radial external force acting in a direction from a central portion of the opening 150 to the inner surface 130b. For example, when a fruiting vegetable is disposed in the opening 150, the shape of the opening 150 is changed by an external force due to growth of the fruiting vegetable. The shape of the opening 150 may be gradually changed from an elliptic cylindrical shape to a shape corresponding to a surface shape of a fruiting vegetable.

An area of the inner surface of the member 130 is maintained substantially constant regardless of the radial external force acting in the direction from the center of the opening 150 to the inner surface 130b. That is, the area of the inner surface of the member 130 is hardly increased according to growth of a fruiting vegetable.

Here, the area of the inner surface of the member 130, which faces a surface of a fruiting vegetable disposed in the opening 150, is maintained to be constant, but a contact area, in which the inner surface of the member 130 is in contact with the surface of the fruiting vegetable, is gradually increased as the fruiting vegetable disposed in the opening 150 grows.

The member 130 may include a first folded portion 110a and a second folded portion 110b. The first folded portion 110a and the second folded portion 110b may be formed to face each other.

The first folded portion 110a and the second folded portion 110b may be portions formed due to external forces that act on both sides of the member having a cylindrical shape. The sectional shape of the inner surface 130b of the member 130 may be maintained in an elliptical shape by the first folded portion 110a and the second folded portion 110b.

Figure 3:
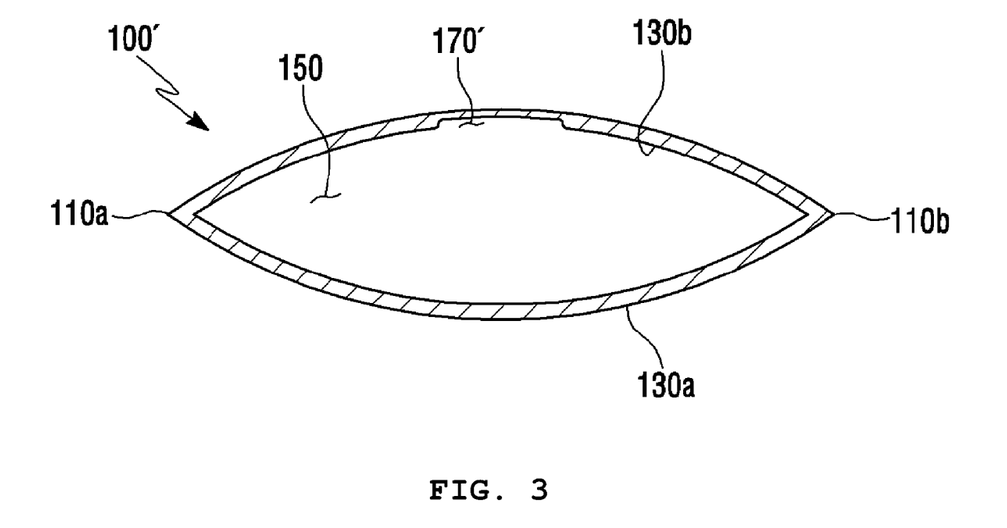
FIG. 3 is a cross-sectional view illustrating a modified example of the device for forming the pattern on the surface of the fruiting vegetable shown in FIG. 1.

The first folded portion 110a and the second folded portion 110b may have an angled shape as shown in FIGS. 1 to 3, but the present invention is not limited thereto. For example, the first folded portion 110a and the second folded portion 110b may have a curved shape.

The number of the folded portions is illustrated in FIGS. 1 to 3 as being two, but the present invention is not limited thereto. For example, the number of folded portions may be three or more.

The member 130 includes the pattern 170. For example, the pattern 170 may be formed on the inner surface 130b of the member 130. The pattern 170 may be formed on a portion of the inner surface 130b and may be an embossed pattern protruding or extending from the inner surface 130b. Here, the pattern 170 may be an engraved pattern. Descriptions will be provided with reference to FIG. 3.

FIG. 3 is a cross-sectional view illustrating a modified example of the device for forming the pattern on the surface of the fruiting vegetable shown in FIG. 1.

In a device 100' for forming a pattern on a surface of a fruiting vegetable shown in FIG. 3, the same reference numerals will be used for the same components as those of the device 100 shown in FIG. 1.

A pattern 170' of the device 100' shown in FIG. 3 has a different shape from the pattern 170 of the device 100 shown in FIG. 1. The pattern 170' of the device 100' shown in FIG. 3 is an engraved pattern that is formed by being engraved on a portion of an inner surface 130b.

On the other hand, the pattern 170 may be a printed pattern formed by being printed on any one of the inner surface 130b and an outer surface 130b of a member 130 rather that the embossed pattern shown in FIG. 2 and the engraved pattern shown in FIG. 3. When the pattern 170 is the printed pattern, the printed pattern 170 may be made of any one of transparent, opaque, and semi-transparent materials.

For example, when the member 130 of the device 100 according to the embodiment of the present invention is made of a transparent or semi-transparent material and the printed pattern 170 is made of an opaque material, except for a portion of a surface of an apple corresponding to the printed pattern 170, a portion of the surface of the apple may be formed to have a natural color of the apple, and the portion of the surface of the apple corresponding to the printed portion 170 may be formed to have a color (for example, a yellow color) that appears when the apple does not receive light.

In another example, when the member 130 of the device 100 according to the embodiment of the present invention is made of a transparent material and the printed pattern 170 is made of a semi-transparent material, except for a portion of a surface of an apple corresponding to the printed pattern 170, a portion of the surface of the apple may be formed to have a natural color of the apple, and the portion of the surface of the apple corresponding to the printed portion 170 may be formed to have a color different from a color that appears when the apple does not receive light.

In still another example, when the member 130 is made of an opaque material and the printed pattern 170 is made of a transparent material, a portion of a surface of an apple corresponding to the member 130 has a color that appears when the apple does not receive light, and a portion of the surface of the apple corresponding to the printed pattern 170 has a natural color of the apple.

Describing the above-described three examples, when transparency of the printed pattern 170 is adjusted, patterns having various colors may be formed on a surface of a fruiting vegetable corresponding to the printed pattern 170.

Figure 4:
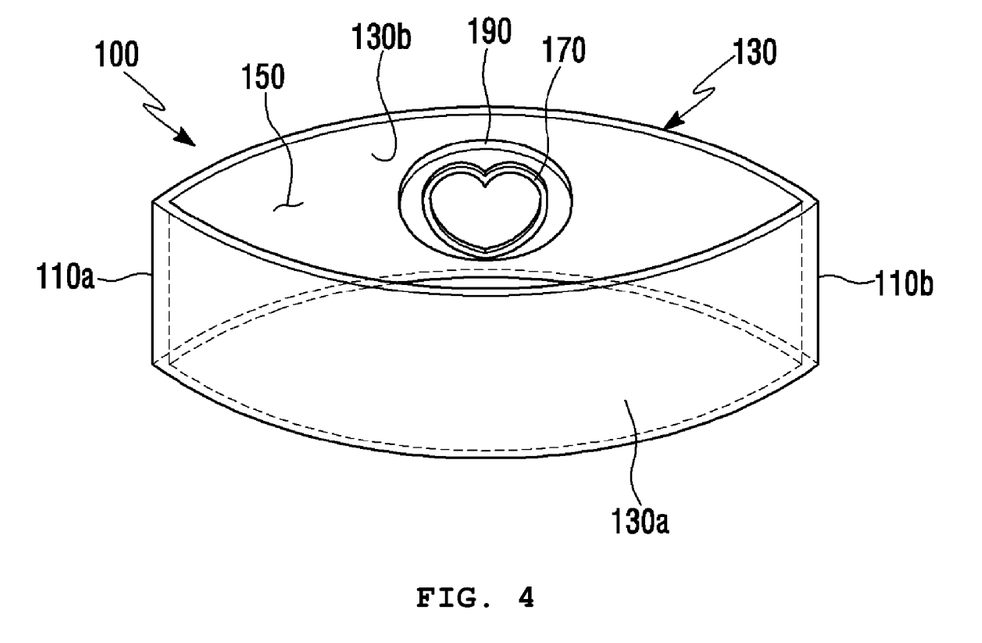
FIG. 4 is a perspective view illustrating a device for forming a pattern on a surface of a fruiting vegetable according to another embodiment of the present invention.

FIG. 4 is a perspective view illustrating a device for forming a pattern on a surface of a fruiting vegetable according to another embodiment of the present invention.

Referring to FIG. 4, a device 100 for forming a pattern on a surface of a fruiting vegetable according to another embodiment of the present invention further includes a pattern insert 190 as compared with that shown FIG. 1. Since the remaining components except for the insert 190 are the same, the insert 190 will be mainly described below, and descriptions of the remaining components will be replaced with the above descriptions.

The insert 190 is disposed between a member 130 and a pattern 170. The pattern 170 is formed on one surface of the insert 190.

The other surface of the insert 190 is coupled to an inner surface 130b of the member 130.

The insert 190 may have a circular plate shape, but the present invention is not limited thereto. The insert 190 may have a polygonal plate shape.

The insert 190 may be made of a flexible material and may be properly attached to the inner surface 130b of the member 130 in response to a change in the inner surface 130b of the member 130.

The insert 190 may be made of the same material as the member 130 and may be transparent, semi-transparent, or opaque. Here, when the member 130 of the device 100 according to another embodiment of the present invention is transparent (or semi-transparent) and transparency of the pattern 170 is different from transparency of the insert 190, colors of portions of a surface of a fruiting vegetable corresponding to the pattern 170 and the insert 190 may be different from colors of other portions of the surface of the fruiting vegetable. In addition, the color of the portion of the surface of the fruiting vegetable corresponding to the pattern 170 may also be different from the color of the portion of the surface of the fruiting vegetable corresponding to the insert 190.

Figure 5A:
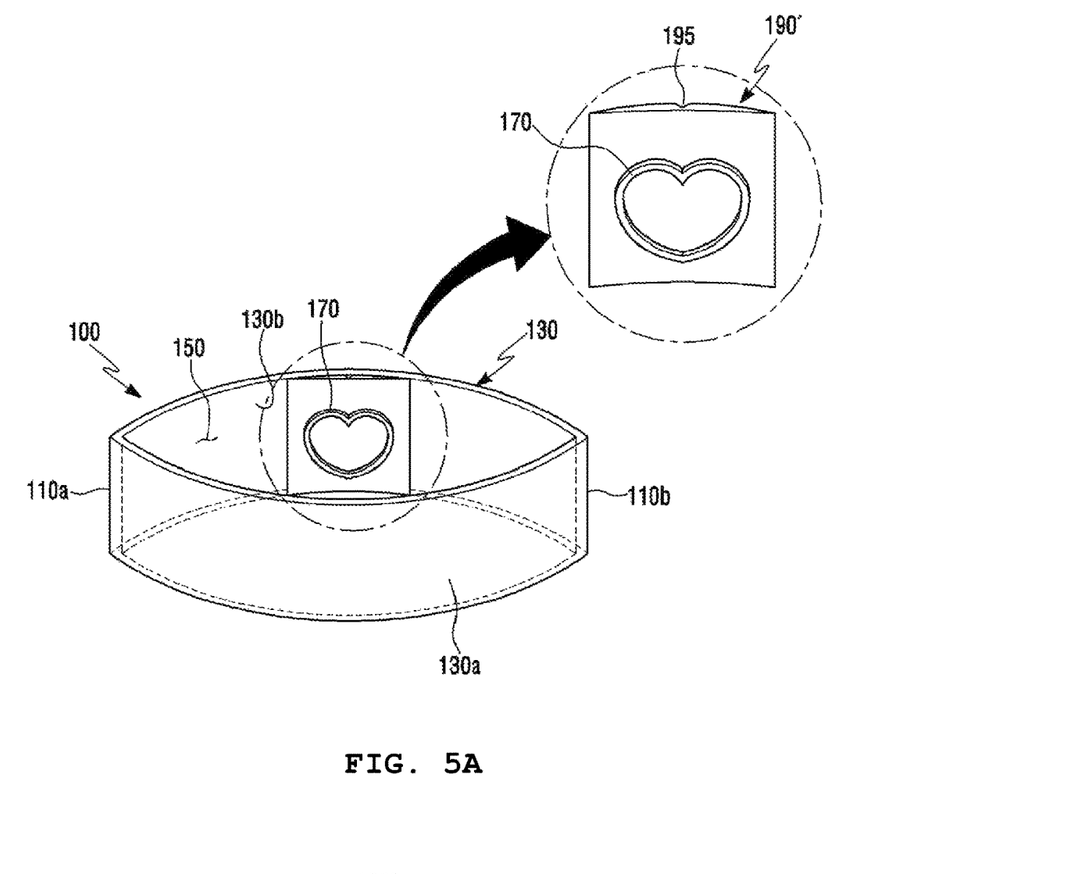
FIGS. 5(A) and (B) are perspective views illustrating a device for forming a pattern on a surface of a fruiting vegetable according to still another embodiment of the present invention.
Figure 6:
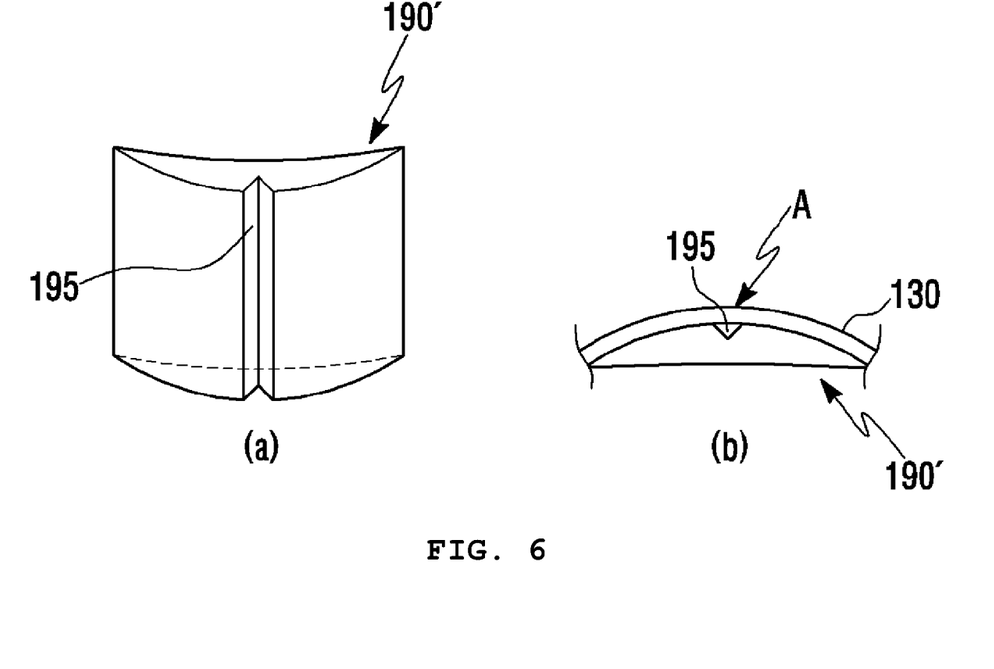
FIG. 6 is a view illustrating an insert shown in FIG. 5 in more detail.

FIG. 5(A) is a perspective views illustrating a device for forming a pattern on a surface of a fruiting vegetable according to still another embodiment of the present invention, and FIG. 6 is a view illustrating an insert shown in FIG. 5 in more detail.

Figure 5B:
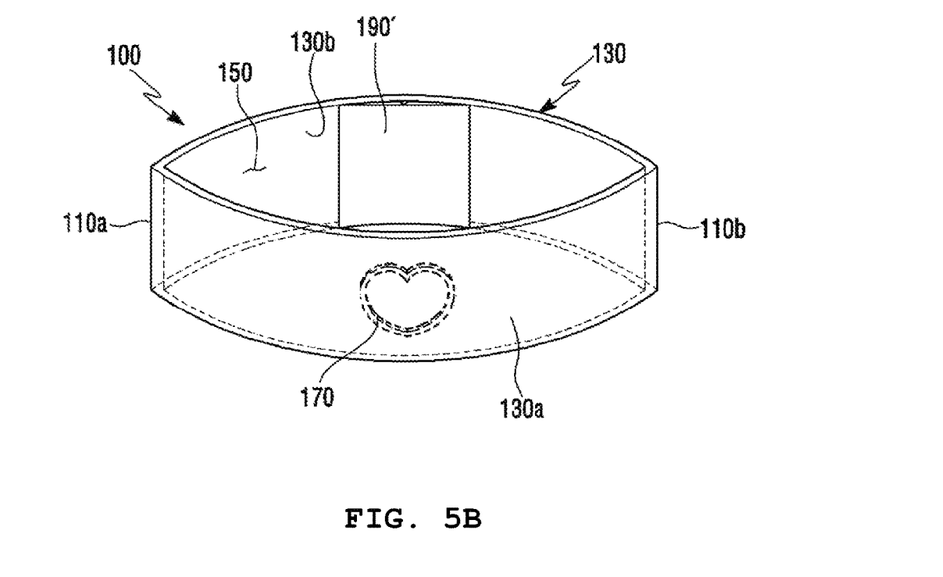

Referring to FIGS. 5 and 6, the device for forming the pattern on the surface of the fruiting vegetable further includes an insert 190' as compared with that shown FIG. 1. Since the remaining components except for the insert 190' are the same, the insert 190' will be mainly described below, and descriptions of the remaining components will be replaced with the above descriptions.

The insert 190' is disposed between a member 130 and a pattern 170. The pattern 170 is formed on one surface of the insert 190'.

One surface of the insert 190' may be flat or have a certain curvature. When one surface of the insert 190' has the certain curvature, the curvature of one surface of the insert 190' may be different from a curvature of the other surface of the insert 190'.

The other surface of the insert 190' is coupled to an inner surface 130b of the member 130.

The other surface of the insert 190' may have a certain curvature corresponding to the inner surface 130b of the member 130.

The other side of the insert 190' may have a groove for cutting 195. The groove for cutting 195 may be elongated in one direction on the other surface of the insert 190'. Here, one direction may be a longitudinal direction as shown in the drawing, but is not limited thereto. For example, one direction may be an oblique direction.

A sectional shape of the groove for cutting 195 may be a V shape but is not limited thereto. The sectional shape of the groove for cutting 195 may be a semicircular shape or a polygonal shape.

When the member 130 is removed from a mature fruiting vegetable, the groove for cutting 195 is for cutting the member without injuring a surface of the mature fruiting vegetable. When there is no groove for cutting, removing the member 130 from the mature fruiting vegetable without any damage to the surface of the fruiting vegetable is very difficult. After growth of the fruiting vegetable is completed, when a user cuts the member 130 in a direction of a cut portion A using a cutting mechanism such as a scissors or a knife, the user may easily remove the device 100 using the groove for cutting 195. The cutting mechanism may easily enter between the member 130 and the mature fruiting vegetable through the groove for cutting 195. Since the groove for cutting 195 guides a movement of the cutting mechanism, the user may accurately and easily cut the member 130 in a straight line.

The insert 190' may be made of a flexible material and may be properly attached to the inner surface 130b of the member 130 in response to a change in the inner surface 130b of the member 130.

The insert 190' may be made of the same material as the member 130 and may be transparent, semi-transparent, or opaque. Here, when the member 130 of the device 100 according to still another embodiment of the present invention is transparent (or semi-transparent), and transparency of the pattern 170 is different from transparency of the insert 190', colors of portions of a surface of a fruiting vegetable corresponding to the pattern 170 and the insert 190' may be different from colors of other portions of the surface of the fruiting vegetable. In addition, the color of the portion of the surface of the fruiting vegetable corresponding to the pattern 170 may also be different from the color of the portion of the surface of the fruiting vegetable corresponding to the insert 190'.

On the other hand, the pattern 170 may not be formed on the insert 190' shown in FIG. 5(B). That is, the pattern 170 and the insert 190' may be spaced apart from each other and may be disposed on the inner surface 130b of the member 130. In this case, the insert 190 may be used only for cutting.

Figure 7:
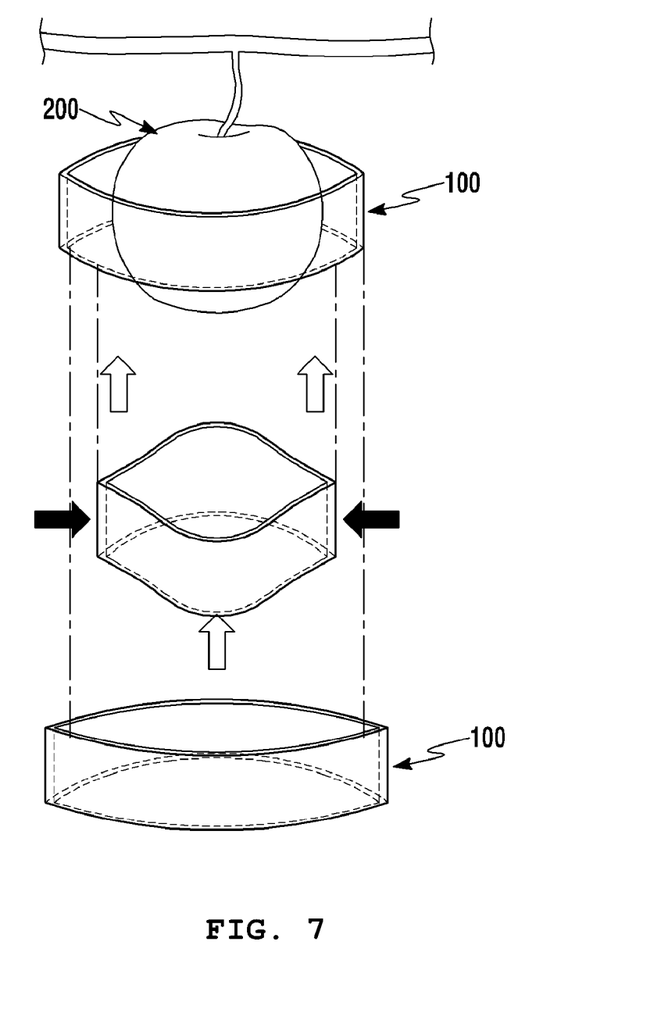
FIG. 7 is a view illustrating a method of using the device (100) for forming the pattern on the surface of the fruiting vegetable according to the embodiment of the present invention shown in FIG. 1.

FIG. 7 is a view illustrating a method of using the device 100 for forming the pattern on the surface of the fruiting vegetable according to the embodiment of the present invention shown in FIG. 1.

Referring to FIGS. 1, 2, and 4, the opening 150 of the member 130 is opened by applying external forces to both sides and, particularly, the first folded portion 110a and the second folded portion 110b of the device 100 for forming the pattern on the surface of the fruiting vegetable according to the embodiment of the present invention. An immature fruiting vegetable 200 is inserted into the opened opening 150. When the member 130 is positioned at a certain position on a surface of the immature fruiting vegetable 200, the external forces applied to the first folded portion 110a and the second folded portion 110b are removed. Then, the member 130 presses the immature fruiting vegetable 200 using elasticity formed by the member 130 made of a plastic material, the first folded portion 110a, and the second folded portion 110b. Thus, the member 130 is mounted on the immature fruiting vegetable 200 by a force pressing the immature fruiting vegetable 200.

Figure 8:
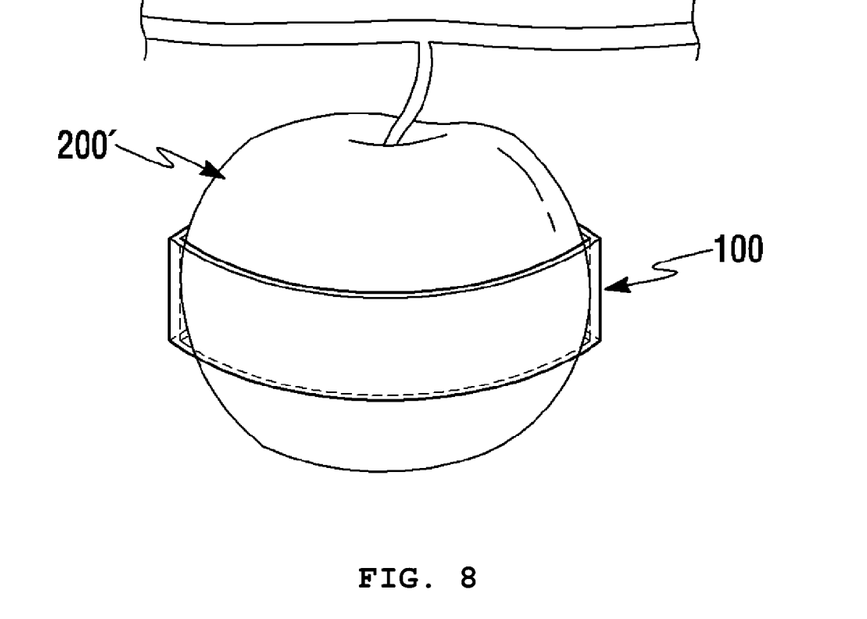
FIG. 8 is a view illustrating a state in which an immature fruiting vegetable grows into a mature fruiting vegetable after the device shown in FIG. 7 is mounted on the immature fruiting vegetable.

FIG. 8 is a view illustrating a state in which the immature fruiting vegetable 200 grows into a mature fruiting vegetable 200' after the device 100 shown in FIG. 7 is mounted on the immature fruiting vegetable 200.

Referring to FIGS. 7 and 8, in a process of the immature fruiting vegetable 200 transforming into the mature fruiting vegetable 200', a shape of the member 130 of the device 100 according to the embodiment of the present invention is changed accordingly as the fruiting vegetable grows. As illustrated in FIG. 7, the length of a circumference of the inner surface of the member (130) is longer than that of a circumference of the surface of the fruiting vegetable (200), so that a part of the inner surface of the member (130) is in contact with the surface of the fruiting vegetable (200), and the other part is not in contact with the surface of the fruiting vegetable (200). As the fruiting vegetable (200) grows, a contact area in which the inner surface of the member (130) is in contact with the surface of the fruiting vegetable (200) increases. That is, as the fruiting vegetable 200 grows, the shape of the member 130 is changed to correspond to a surface shape of the fruiting vegetable 200.

In a process of the immature fruiting vegetable 200 growing into the mature fruiting vegetable 200', the shape of the member 130 is changed to correspond to the surface shape of the fruiting vegetable 200. The pattern 170 formed on the inner surface 130b of the member 130 is not imprinted on a surface of the fruiting vegetable 200 until the opening 150 of the member 130 is fully filled with the fruiting vegetable 200. The pattern 170 formed on the inner surface 130b of the member 130 is imprinted on the surface of the fruiting vegetable 200 after the opening 150 of the member 130 is closely filled with the fruiting vegetable 200.

As described above, by using the device 100 according to the embodiment of the present invention, when the immature fruiting vegetable 200 does not grow as much as the opening 150 of the member 130, the pattern 70 is not completely imprinted on the surface of the fruiting vegetable 200, but after a circumference of the surface of the fruiting vegetable 200, which is in contact with the inner surface 130b of the member 130, is equal to a circumference of the inner surface 130b of the member 130, the pattern 70 is imprinted on the surface of the fruiting vegetable 200. Thus, a character corresponding to the pattern 170 is clearly and cleanly formed on the surface of the fruiting vegetable 200 without being spread and split.

Figure 9:
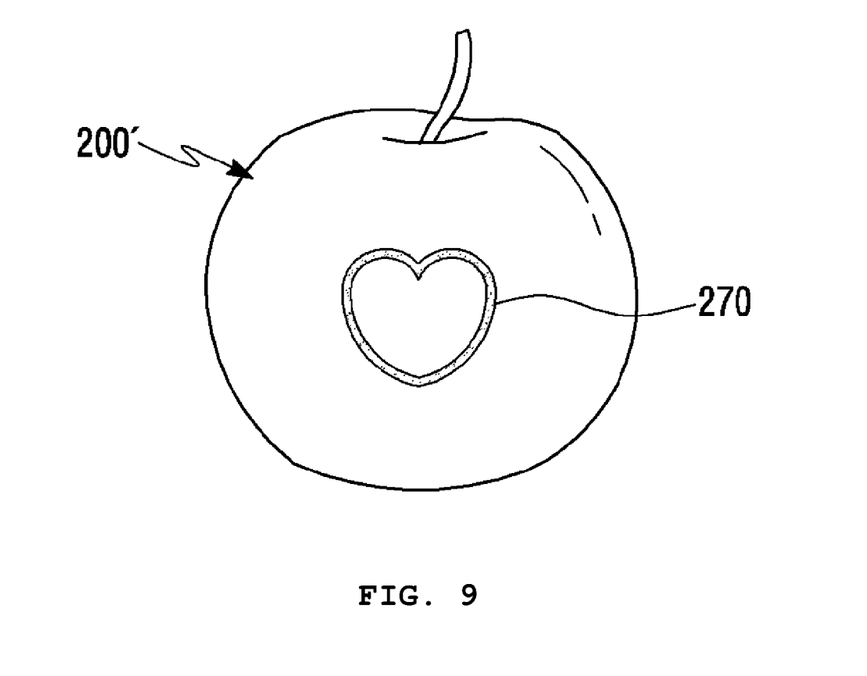
FIG. 9 is a view illustrating a character formed on a surface of the mature fruiting vegetable when the device shown in FIG. 8 is removed.

FIG. 9 is a view illustrating a character 270 formed on a surface of the mature fruiting vegetable 200' when the device 100 shown in FIG. 8 is removed.

Referring to FIG. 9, as shown in FIG. 5, when the device 100 mounted on the surface of the mature fruiting vegetable 200' is removed, the certain character 270 is formed on the surface of the mature fruiting vegetable 200'. The certain character 270 has a shape corresponding to the pattern 170 shown in FIG. 1. Since the pattern 170 shown in FIG. 1 is the embossed pattern, the character 270 has an engraved shape corresponding to the embossed pattern.

On the other hand, when the device 100' including the engraved pattern 170' shown in FIG. 3 is used, the character 270 having an embossed shape is formed on the mature fruiting vegetable 200' as shown in FIG. 9.

As described above, by using the devices 100 and 100' according to embodiments of the present invention, a certain pattern may be formed on the surface of the fruiting vegetable 200'.

Each of the above-described devices 100 and 100' for forming the pattern on the surface of the fruiting vegetable surface according to the various embodiments of the present invention shown in FIGS. 1 to 9 may further include a bag.

The member 130 may be coupled to an interior of the bag. The outer surface 130a of the member 130 may be coupled to an inner surface of the bag.

The bag may be made of a transparent, semi-transparent, or opaque material.

Since a fruiting vegetable such as an apple or a pear generally grows in a state of being wrapped with a bag, it is necessary to couple the devices 100 and 100' themselves shown in FIGS. 1 to 9 to the interior of the bag. In this case, when the devices 100 and 100' shown in FIGS. 1 to 9 are mounted on a surface of an immature fruiting vegetable and then the immature fruiting vegetable is wrapped with the bag, the pre-mounted devices 100 and 100' may be dislocated and thus a position thereof may be changed while the immature fruiting vegetable is wrapped with the bag. In addition, when a foreign object is interposed between the devices 100 and 100' shown in FIGS. 1 to 9 and the fruiting vegetable 200', while the fruiting vegetable 200' grows, the surface of the fruiting vegetable 200' may be scratched by the foreign object. Thus, an outer cover such as the bag is required to prevent a falling foreign object from being sandwiched between the devices 100 and 100' shown in FIGS. 1 to 9 and the fruiting vegetable 200'. In order to prevent such a problem, the member 130 may be coupled to the interior of the bag.

Although the present invention has been described with reference to the limited embodiments and accompanying drawings, it would be appreciated by those skilled in the art that the present invention is not limited thereto but various modifications and alterations might be made without departing from the scope defined in the claims and their equivalents. However, it is obvious that simple modifications and alternations are not to be regarded as a departure from the scope of the present invention.

DESCRIPTIONS OF REFERENCE NUMERALS

100, 100': device for forming pattern on surface of fruiting vegetable
130: member
170: pattern

What is claimed is:

1. A device for forming a pattern on a surface of a fruiting vegetable, the device comprising:
a member which has an inner surface, an outer surface, an opening defined by the inner surface, and an annular shape without a cut portion and is made of a non-elastic plastic material; and
a pattern which is formed on the inner surface of the member,
wherein the member includes a first folded portion and a second folded portion, and the inner surface of the member has a first opposite surface and a second opposite surface which face each other due to the first folded portion and the second folded portion,
wherein the first opposite surface and the second opposite surface press both sides of a surface of an immature fruiting vegetable through elasticity formed by the first folded portion and the second folded portion so that the member is mountable on the surface of the fruiting vegetable,
wherein the shape of the member changes to correspond to a surface shape of the fruiting vegetable as the fruit vegetable grows,
wherein a length of a circumference of the inner surface of the member is longer than a length of a circumference of the surface of the fruiting vegetable, so that a part of the inner surface of the member is in contact with a part of the surface of the fruiting vegetable,
wherein a space is formed between the part of the surface of the fruiting vegetable and each of the first opposite surface and the second opposite surface, the space being gradually decreased as the fruiting vegetable grows.

2. The device of claim 1, wherein, after a circumference of the surface of the fruiting vegetable, which is in contact with the inner surface of the member, is equal to a circumference of the inner surface of the member, the pattern is imprinted on the surface of the fruiting vegetable.

3. The device of claim 1, wherein the first folded portion and the second folded portion are disposed to face each other.

4. The device of claim 1, wherein the first folded portion and the second folded portion have an angled or curved shape.

5. The device of claim 1, wherein the pattern is an embossed pattern or an engraved pattern.

6. The device of claim 1, wherein the pattern is a printed pattern formed on at least one of the inner surface, the outer surface, and an interior of the member.

7. The device of claim 1, further comprising an insert disposed between the pattern and the inner surface of the member.

8. The device of claim 7, wherein the insert has one surface coupled to the inner surface of the member, and the one surface of the insert has a groove for cutting.

9. The device of claim 7, wherein transparency of the insert is different from transparency of the pattern.

10. The device of claim 1, further comprising an insert disposed on the inner surface of the member and spaced apart from the pattern.

11. The device of claim 10, wherein the insert has one surface coupled to the inner surface of the member, and the one surface of the insert has a groove for cutting.

12. The device of claim 10, wherein transparency of the insert is different from transparency of the pattern.

* * * * *